(12) United States Patent
Imamura

(10) Patent No.: US 6,381,686 B1
(45) Date of Patent: Apr. 30, 2002

(54) PARALLEL PROCESSOR COMPRISING MULTIPLE SUB-BANKS TO WHICH ACCESS REQUESTS ARE BYPASSED FROM A REQUEST QUEUE WHEN CORRESPONDING PAGE FAULTS ARE GENERATED

(75) Inventor: Yoshihiko Imamura, Ibaraki (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/228,653

(22) Filed: Jan. 12, 1999

(30) Foreign Application Priority Data

Jan. 16, 1998 (JP) .......................................... 10-007000

(51) Int. Cl.$^7$ ................................................ G06F 9/30
(52) U.S. Cl. ............................... 711/203; 711/5; 711/6; 711/117; 712/28
(58) Field of Search ................................ 710/240, 128; 711/157, 119, 5, 6, 117, 203, 129; 712/245, 228, 234, 28, 203

(56) References Cited

U.S. PATENT DOCUMENTS

| | | | | |
|---|---|---|---|---|
| 4,843,542 A | * | 6/1989 | Dashiell et al. | ............. 711/119 |
| 5,511,224 A | * | 4/1996 | Tran et al. | .................. 710/128 |
| 5,845,329 A | * | 12/1998 | Onishi et al. | ................ 711/157 |
| 6,078,983 A | * | 6/2000 | Hanawa et al. | ............. 710/240 |

OTHER PUBLICATIONS

K. Hwang and F. Briggs, "Computer Architecture and Parallel Processing", pp. 79–80, McGraw–Hill, 1984.*

"Cache Subsystem", Chapter 6 of the "Embedded Intel486 Processor Hardware Reference Manual".*

D. Locke, et al., "Priority Inversion and Its Control: An Experimental Investigation", pp. 39–42, in Proceedings of the second international workshop on Real–time Ada issues, Jun. 1–3, 1988.*

* cited by examiner

Primary Examiner—Meng-Al T. An
Assistant Examiner—Wen-Tai Lin
(74) Attorney, Agent, or Firm—Ronald P. Kananen, Esq.; Rader, Fishman & Grauer PLLC

(57) ABSTRACT

A parallel processor capable of exhibiting a high processing performance, which when receiving as input access requests generating page faults to sub-banks from a plurality of processor elements connected to a common bus and another access request is input while data is being transferred between sub banks and an external memory via an external access bus in response to the input access requests, a shared memory stores the other access request in a request queue and makes a control circuit execute the stored access request when the stored access request does not generate a page fault.

21 Claims, 9 Drawing Sheets

PARALLEL PROCESSOR COMPRISING MULTIPLE SUB-BANKS TO WHICH ACCESS REQUESTS ARE BYPASSED FROM A REQUEST QUEUE WHEN CORRESPONDING PAGE FAULTS ARE GENERATED

BACKGROUND OF THE INVENTION

1. Field of the Invention

The present invention relates to a parallel processor comprising a plurality of processor elements and a shared memory connected via a common bus and to a processing method carried out thereon.

2. Description of the Related Art

In recent years, parallel processors which execute in parallel a plurality of simultaneously executable instructions in a program by a plurality of processor elements (PE) built into a single chip so as to shorten the execution time for the program as a whole have been developed.

A variety of architectures are being proposed for such parallel processors. Among them, there is one in which a plurality of processor elements and a shared memory are connected to a set of common buses.

FIG. 9 is a view of the system configuration of a general parallel processor 1.

As shown in FIG. 9, the parallel processor 1 has built into one chip a common bus 2, n number of processor elements $3_1$ to $3_n$, a shared memory 4, and a bus unit 5. The common bus 2 has connected to it the processor elements $3_1$ to $3_n$, the shared memory 4, and the bus unit 5. The bus unit 5 is connected to a main memory 7 via an external chip interface 6. One data port I/O is provided in a memory cell region 4a of the shared memory 4.

In the parallel processor 1, data is transferred via the common bus 2 and the data port I/O when the processor elements $3_1$ to $3_n$ access the data stored in the shared memory 4.

In the above parallel processor 1, however, data transfer between the processor elements $3_1$ to $3_n$ and the shared memory 4 and data transfer between the shared memory 4 and the main memory 7 are both carried out via the common bus 2. Furthermore, since the memory cell region 4a of the shared memory 4 has only one data port I/O, there is the disadvantage that the waiting time of the processor elements $3_1$ to $3_n$ may frequently become long for the following reasons.

Namely, when a page fault occurs in the shared memory 4 and the pages are being exchanged between the shared memory 4 and the main memory 7, the processor elements $3_1$ to $3_n$ cannot access the shared memory 4 because the common bus 2 is in use. Accordingly, an access request from the processor elements $3_1$ to $3_n$ to the shared memory 4 ends up being kept waiting until the completion of the page exchange processing and the processing performance of the parallel processor 1 becomes low.

SUMMARY OF THE INVENTION

An object of the present invention is to provide a parallel processor and a processing method which can exhibit a high processing performance.

To overcome the above disadvantage of the related art and to achieve the above object, a parallel processor of the present invention comprises a plurality of processor elements, each including an internal memory storing one or more sub-pages and performing processing using data stored in the internal memory; a first bus connected to the plurality of processor elements; a second bus connected to an external memory; and a shared memory connected to both the first and second buses, the shared memory including a storage means having a plurality of sub-banks storing the sub-pages, a control means for controlling data transfer between the internal memory of the processor element and the storage means through the first bus and data transfer between the storage means and the external memory through the second bus, and an access request management means for receiving as input an access request which generates a page fault to the storage means from the processor elements, storing another access request when another access request is input during the data transfer due to the access request between the shared memory and the external memory through the second bus, and causing the control means to execute the stored other access request when the stored other access request does not generate a page fault.

In the parallel processor of the present invention, preferably the access request management means enables storage of a plurality of access requests and makes the control means execute an access request among the plurality of stored access requests which does not generate a page fault when a plurality of access requests are stored prior to a stored access request generating a page fault.

Further, the processing method of the present invention comprises storing one or more sub-pages in a shared memory having a storage regions comprising a plurality of sub-banks each having a single data port and accessed by a plurality of processor elements; controlling data transfer between an internal memory of a processor element and the shared memory through a first bus and data transfer between the shared memory and an external memory through a second bus in response to an access request from the processor element; and, when a processor element issues an access request accompanied with a page fault to the shared memory and during the transfer of data between the shared memory and external memory through the second bus in response to that access request another processor element issues an access request, storing the access request issued by the other processor element, judging if the stored access request causes a page fault or not, and, when judging that it does not cause a page fault, executing the stored access request.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments of a parallel processor of the present invention will be explained in detail.

Figure 1:
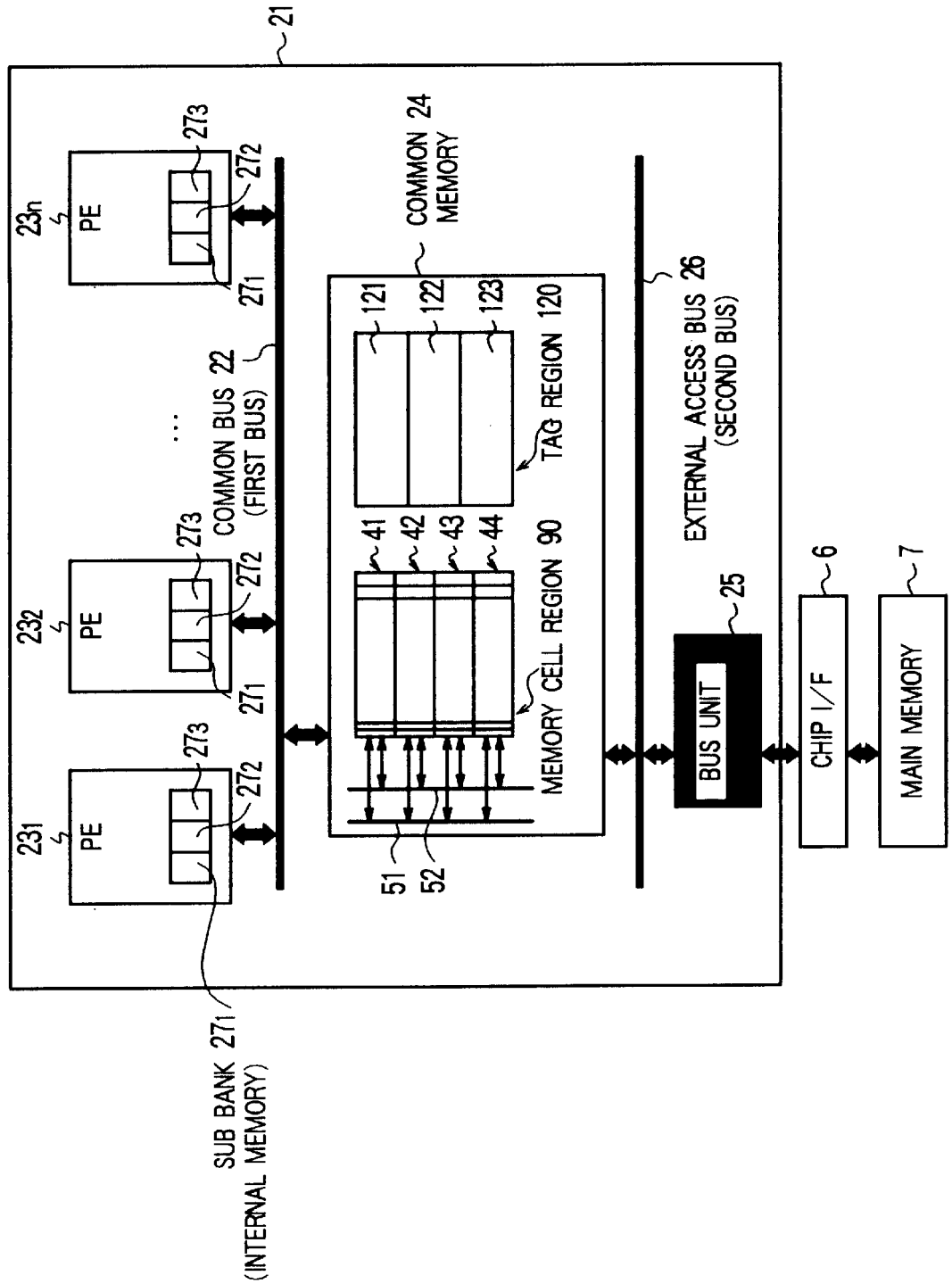
FIG. 1 is a view of the system configuration of a parallel processor of an embodiment of the present invention.

FIG. 1 is a view of the system configuration of a parallel processor 21 of the present embodiment.

As shown in FIG. 1, the parallel processor 21 comprises, for example, a common bus 22 as a first bus, processor elements $23_1$ to $23_n$, a shared memory 24, a bus unit 25, and an external access bus 26 as a second bus.

In the parallel processor 21, the processor elements $23_1$ to $23_n$ and the shared memory 24 are connected to the common bus 22. Also, the shared memory 24 and the bus unit 25 are connected to the external access bus 26.

The common bus 22 has a bus width of 128 bits, while the external access bus 26 has a bus width of 32 bits. The common bus 22 has a data transfer rate of more than four times that of the external access bus 26.

Note that it is possible to make the bus widths of the common bus 22 and the external access bus 26 equal.

When the parallel processor 21 is, for example, a MIMD (multiple instruction multiple data) type parallel processor, each of the processor elements $23_1$ to $23_n$ has a program counter and carries out the processing independently from the others in response to instructions stored at addresses of an instruction memory, not illustrated, indicated by the program counter. As the processor elements $23_1$ to $23_n$, for example, RISC (reduced instruction set computer) type general-purpose processors may be used.

The processor elements $23_1$ to $23_n$ are provided with sub-banks $27_1$, $27_2$, and $27_3$ as internal memories which can store a plurality of sub-pages, for example, three sub-pages. Here, a sub-page is 521 bytes of data stored in storage regions of continuous addresses on a main memory 7, and one page is composed by sub-pages of four continuous addresses.

Note that the numbers of sub-banks provided to the processor elements $23_1$ to $23_n$ can be set different from each other.

The processor elements $23_1$ to $23_n$, as explained later, read the sub-pages from the shared memory 24 and store the same in the sub-banks $27_1$ to $27_3$, but it is possible to store sub-pages of different pages among the processor elements $23_1$ to $23_n$ and among the sub-banks $27_1$ to $27_3$.

The bus unit 25 is connected to the main memory 7 via a chip interface 6 provided outside the parallel processor 21.

The main memory 7 has a memory space having 4 Gbytes of continuous addresses.

Figure 2:
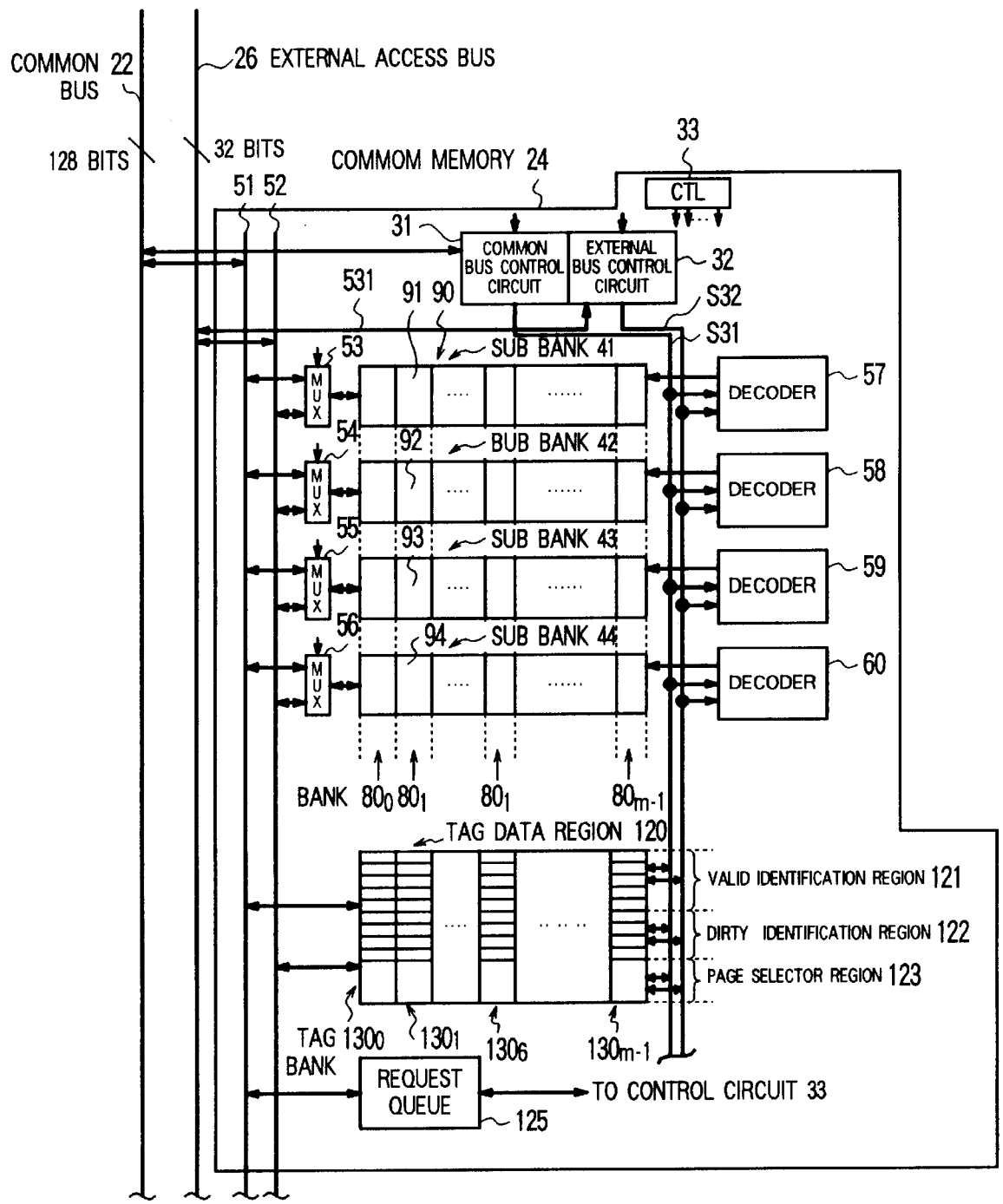
FIG. 2 is a view of the configuration of a shared memory shown in FIG. 1.

FIG. 2 is a view of the configuration of the shared memory 24 shown in FIG. 1.

As shown in FIG. 2, the shared memory 24 comprises, for example, a common bus control circuit 31, an external bus control circuit 32, a control circuit 33, memory internal buses 51 and 52, multiplexers (MUX) 53, 54, 55, and 56, a memory cell region 90 as a first memory means, address decoders 57, 58, 59, and 60, a tag data region 120 as a second memory means, and a request queue 125.

Note that in the present embodiment, the common bus control circuit 31, the external bus control circuit 32, and the control circuit 33 function as a control means.

The control circuit 33 controls the common bus control circuit 31, the external bus control circuit 32, the multiplexers 53 to 56, and the address decoders 57 to 60.

Figure 3:
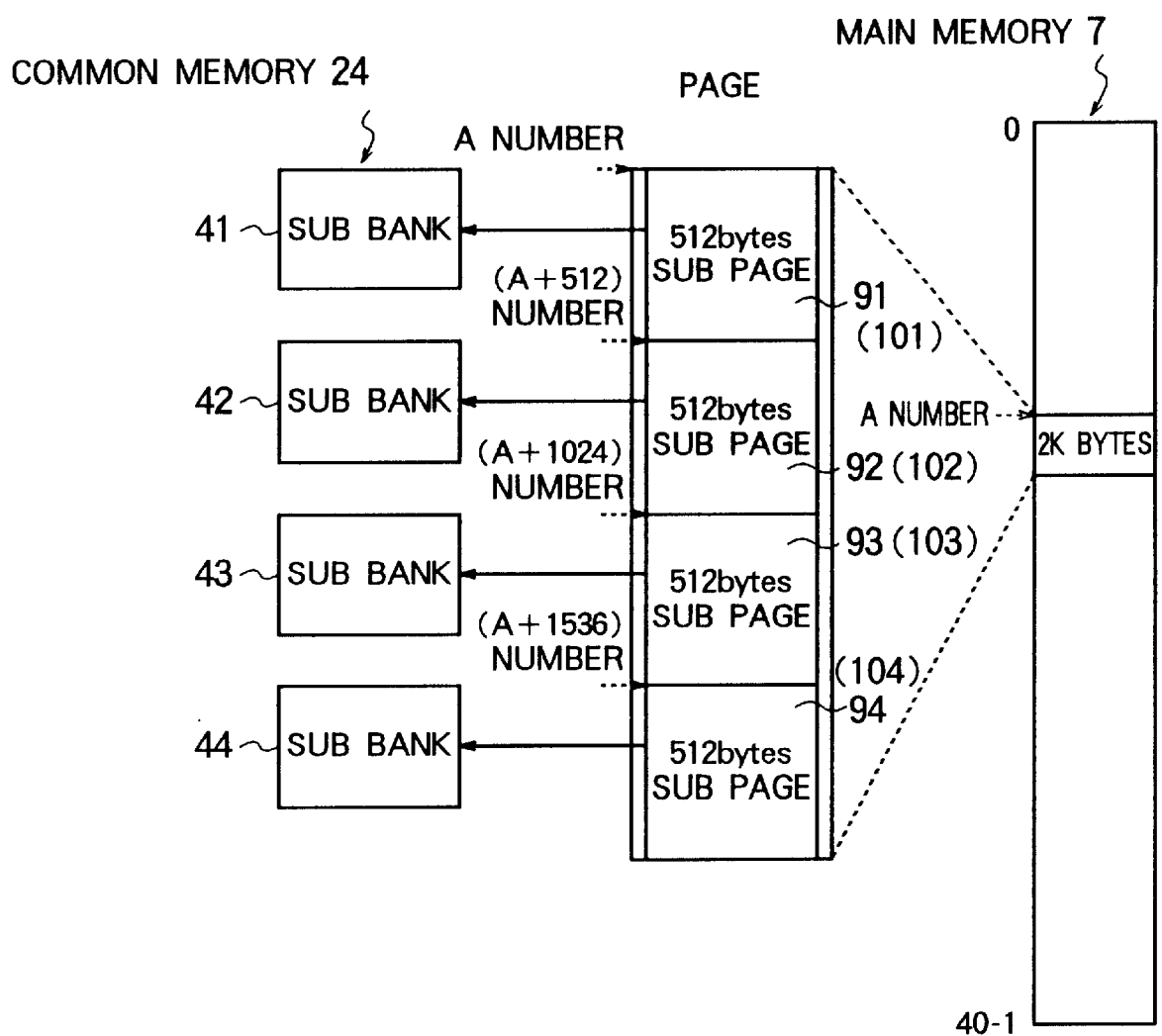
FIG. 3 is a view for explaining a sub-page stored in a memory sub-bank shown in FIG. 2.

Also, when a sub-page exchange request signal (access request) is input from the processor elements $23_1$ to $23_n$, the control circuit 33 judges whether or not the requested sub-page is stored in the memory cell region 90 or not (whether a page hit exists or not) by referring to tag data as characteristic data stored in the tag data region 120. When the control circuit judges that a page fault has occurred, the control circuit determines the page to be covered by the replacement with the page to be exchanged with from the main memory 7 from among a plurality of pages stored in the main memory cell region 90 by a method explained later with reference to FIG. 3.

Also, the control circuit 33 controls the page transfer between the shared memory 24 and the main memory 7 so as to transfer the sub-pages requested by the processor elements $23_1$ to $23_n$ first from the main memory 7 to the shared memory 24.

The common bus control circuit 31 controls the transfer of the sub-pages between the processor elements $23_1$ to $23_n$ and the memory sub-banks 41 to 44 via the memory internal bus 51 and the common bus 22. Specifically, the common bus control circuit 31 controls the address decoders 57 to 60 by outputting a control signal S31 and controls the switching of the multiplexers 53 and 54 based on a control signal from the control circuit 33.

The external bus control circuit 32 controls the page transfer between the memory sub-banks 41 to 44 and the main memory 7 via the memory internal bus 52 and the external access bus 26. Specifically, the external bus control circuit 32 outputs a control signal S32 to control the address decoders 57 to 60 and controls the switching of the multiplexers 53 and 54 based on the control signal from the control circuit 33.

The multiplexers 53 to 56 connect the respective memory sub-banks 41 to 44 to one of the memory internal bus 51 or 52 based on the control signals S31 and S32 and a control signal from the control circuit 33.

The address decoders 57 to 60 decode the control signals S31 and S32 to control the access to the memory sub-banks 41 to 44.

The memory cell region 90 is physically and equally divided into four memory sub-banks 41 to 44. Each of the memory sub-banks 41 to 44 is provided with a single data port.

Also, the memory cell region 90 is divided by m number of banks $80_0$ to $80_{m-1}$ in order to be equally distributed among the memory sub-banks 41 to 44.

Each of the memory sub-banks 41 to 44 has a memory capacity able to store, for example, m number of sub-pages. Note that the sub-pages include image data.

The memory sub-banks 41 to 44 exchange data in sub-page units among the processor elements $23_1$ to $23_n$ via the multiplexers 53 to 56, the memory internal bus 51, and the common bus 22. Here, the "exchanging of data" includes a write operation of data from the processor elements $23_1$ to $23_n$ to the memory sub-banks 41 to 44, a read operation of data from the processor elements $23_1$ to $23_n$ to the memory sub-banks 41 to 44, and both of the operations.

Since the common bus 22 has a 128-bit bus width, a minimum of 32 (=512×8/128) bus transactions are required to transfer a 512-byte sub-page in a bus operation via the common bus 22 in which a sub-page is the unit of one data transfer.

Also, the memory banks 41 to 44 exchange data with the main memory 7 in page units stored in the banks $80_0$ to $80_{m-1}$ via the multiplexers 53 to 56, the memory internal bus 52, and the external access bus 26. Here, one page is 2 Kbytes and is composed of 4 sub-pages.

Accordingly, when the head address of the sub-pages which the processor elements $23_1$ to $23_n$ are trying to access is the address A, address (A+512), address (A+1024), or address (A+1536), one page's worth of data stored in 2 Kbytes of continuous addresses from the address A in the main memory 7 is transferred to the shared memory 4, then the one page's worth of data is divided into four sub-pages and is stored in the banks $80_0$ to $80_m$.

In the present embodiment, a 4 Gbyte memory space of the main memory 7 is indicated by a 32-bit address. Here, the 31st to 11th bits of the 32-bit address indicate the head address of the page and the 10th to 0th bits indicate the address within the page. Also, the 10th and 9th bits indicate a sub-bank.

It is preferable that the amount of the data of the sub-pages stored in the memory sub-banks 41 to 44 be standardized in the system as a whole so that the sub-pages can be used in common by all of the processor elements $23_1$ to $23_n$. In the present embodiment, the memory capacity of the sub-bank $27_1$ of the processor elements $23_1$ to $23_n$ is set to 512 bytes and the amount of data of a sub-page is also set to 512 bytes.

Here, since the external access bus 26 has a bus width of 32 bits, a minimum of 512 (=2048×8/32) bus transactions are required to transfer a 2 Kbyte page in one bus operation via the external access bus 26 in which a page is the unit of one data transfer.

The tag data region 120 stores, as shown in FIG. 2, tag data as the characteristic data of a sub-page stored in the memory cell region 90 composed of the memory sub-banks 41 to 44.

The tag data region 120 has tag banks $130_0$ to $130_{m-1}$ which correspond to the banks $80_0$ to $80_{m-1}$. Data indicating the characteristics of the sub-pages stored in the respective banks $80_0$ to $80_m$ are stored in the tag banks $130_0$ to $130_{m-1}$.

The tag data is comprised of a valid identification region 121, a dirty identification region 122, and a page selector region 123.

The valid identification region 121 is provided with one valid bit indicating the validity of the data of a sub-page for each of the sub-pages. For example, "1" indicating "valid" is set for the valid bit corresponding to a valid sub-page in the valid identification region 121, while "0" indicating "invalid" is set for the valid bit corresponding to an invalid sub-page.

The dirty identification region 122 is provided with one dirty bit indicating whether data of a sub-page is dirty or not for each sub-page. Here, "dirty" means that there was a write operation from the processor elements $23_1$ to $23_n$ to the sub-page in question. When releasing the storage region storing the sub-page, the sub-page has to be written back in the main memory 7. Namely, a write back operation is necessary.

For example, "1" indicating "valid" is set for a dirty bit corresponding to a dirty sub-page in the dirty identification region 122, while "0" indicating "invalid" is set for a dirty bit corresponding to a not-dirty sub-page.

The page selector region 123 has a page selector indicating an identification number of a page (for example, the head address of a page) stored in the banks $80_0$ to $80_m$.

When a plurality of access requests from the processor elements $23_1$ to $23_n$ to the shared memory 4 input via the common bus 22 and the memory internal bus 51 compete, the request queue 125 stores the access requests in a queue and outputs the same to the control circuit 33 in the procedure shown below for execution.

Figure 4:
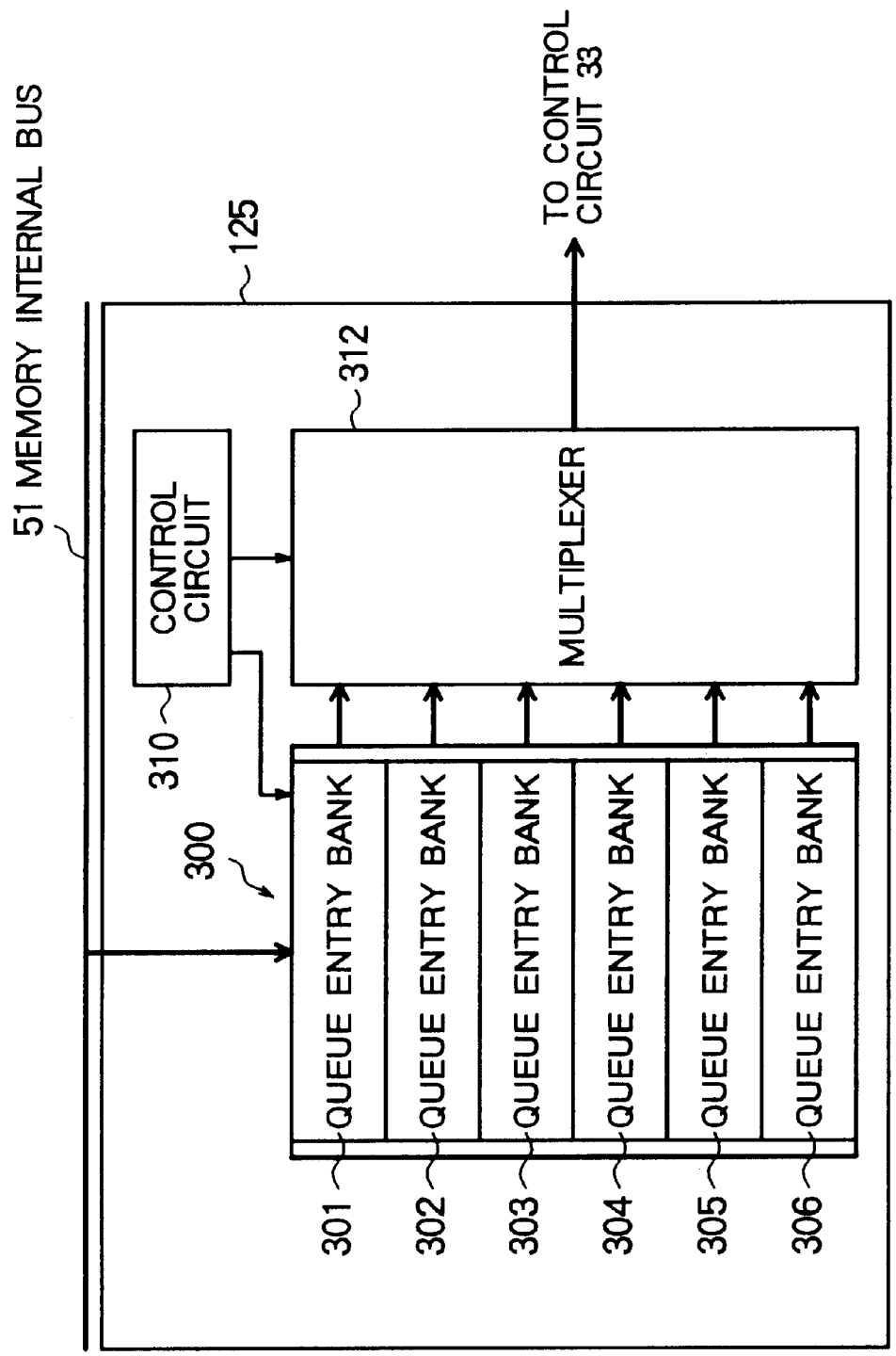
FIG. 4 is a view of the configuration of a request queue shown in FIG. 2.

FIG. 4 is a view of the configuration of the request queue 125.

As shown in FIG. 4, the request queue 125 has a queue entry block 300, a control circuit 310; and a multiplexer 312.

The queue entry block 300 is configured by six queue entry banks 301 to 306 connected in order.

The queue entry bank 301 is connected to the memory internal bus 51 and inputs and stores access requests such as a sub-page exchange request signal to the memory cell region 90 from the processor elements $23_1$ to $23_n$ via the common bus 22 and memory internal bus 51. The queue entry bank 301 outputs the stored access requests to the queue entry bank 301 or multiplexer 312 of the following stage in response to control from the control circuit 310.

The queue entry banks 302 to 305, in response to control from the control circuit 310, input and store the access requests from the queue entry banks 301 to 304 of the previous stage and output the stored access requests to the queue entry banks 303 to 306 or the multiplexer 312 of the following stage.

Also, the queue entry bank 306, in response to control from the control circuit 310, inputs and stores the access requests from the queue entry bank 305 and outputs the stored access requests in question to the multiplexer 312.

The multiplexer 312, in response to the control from the control circuit 310, is connected to one of the queue entry banks 301 to 306 to the control circuit 33 and output the access requests stored in the connected queue entry bank to the control circuit 33.

Below, the operation of the request queue 125 will be explained.

Case of No Preemptive Reading of Access Request

Figure 5:
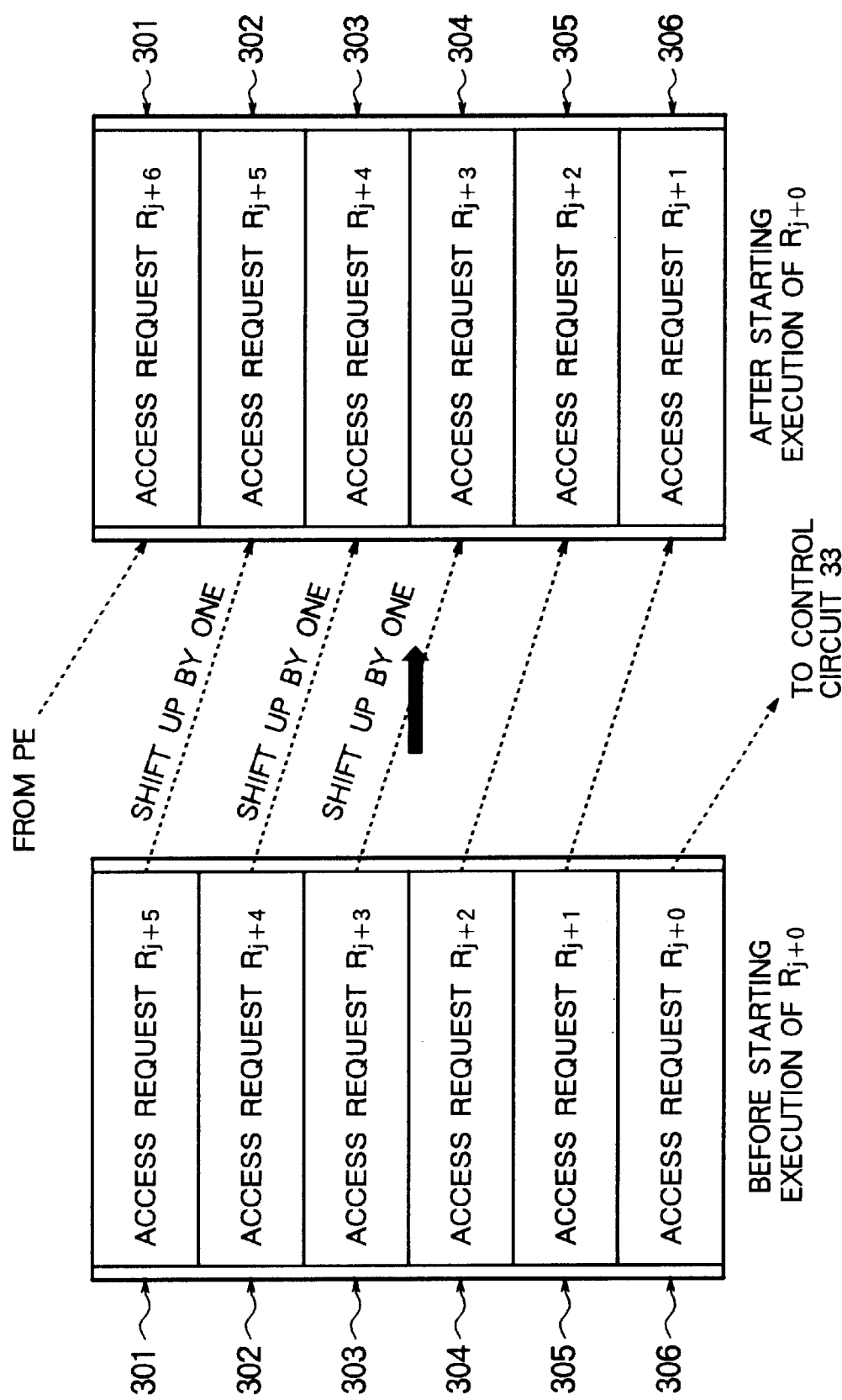
FIG. 5 is a view for explaining an operation when access requests of the request queue shown in FIG. 2 are not read in advance.

FIG. 5 is a view for explaining an operation of the request queue 125 in the case of no preemptive reading of access requests.

For example, consider the case where, when an access request $R_{j-1}$ is output from the processor element $23_1$ to the shared memory 24 via the common bus 22 and access processing is being carried out to the memory cell region 90 using the common bus 22 by the access request $R_{j-1}$, access requests $R_{j+0}$, $R_{j+1}$, $R_{j+2}$, $R_{j+3}$, $R_{j+4}$, and $R_{j+5}$ are generated from the processor elements $23_2$ to $23_n$. Here, all of the access requests $R_{j+0}$ to $R_{j+5}$ are, for example, accesses not accompanied with page faults.

In this case, as shown in FIG. 5A, the access requests $R_{j+0}$, $R_{j+1}$, $R_{j+2}$, $R_{j+3}$, $R_{j+4}$, and $R_{j+5}$ are respectively stored in the queue entry banks 306, 305, 304, 303, 302, and 301.

Then, when the access processing using the common bus 22 by the access request $R_{j-1}$ is completed, the queue entry bank 306 and the control circuit 33 are connected via the multiplexer 312 by the control from the control circuit 310 shown in FIG. 4 and the access request $R_{j+0}$ stored in the queue entry bank 306 is output to the control circuit 33. As a result, access processing to the memory cell region 90 in response to the access request $R_{j+0}$ starts.

By the control from the control circuit 310, the access requests $R_{j+1}$, $R_{j+2}$, $R_{j+3}$, $R_{j+4}$, and $R_{j+5}$ are shifted (transferred) and stored in the respective queue entry banks 306, 305, 304, 303, and 302. Also, the access request $R_{j+6}$ from the processor elements $23_1$ to $23_n$ are stored in the queue entry bank 301 via the common bus 22 and memory internal bus 51. As a result, the state of storage of the queue entry block 300 becomes as shown in FIG. 5B.

Case of Preemptive Reading of Access Request

Figure 6:
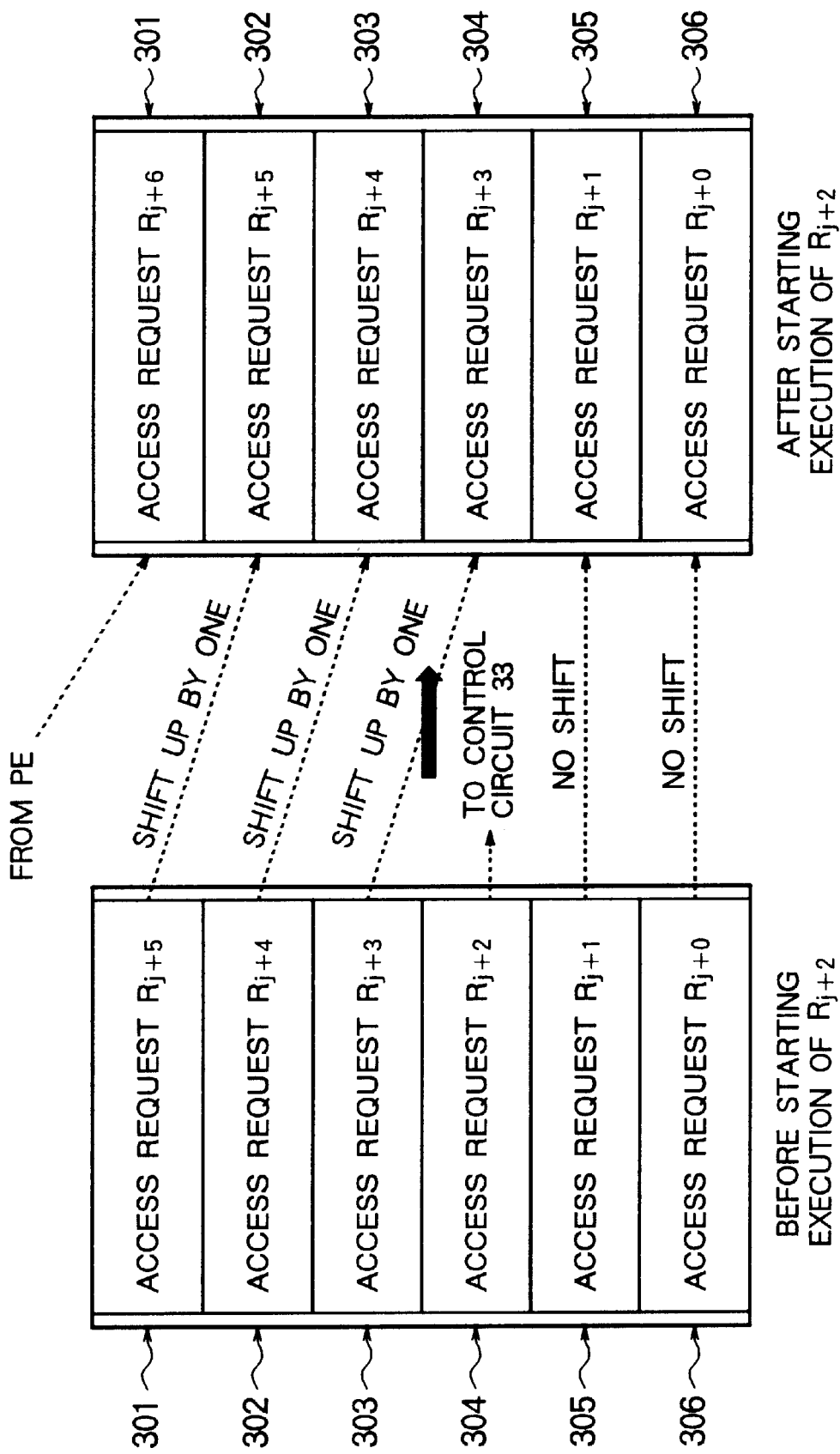
FIG. 6 is a view for explaining an operation when access requests of the request queue shown in FIG. 2 are read in advance.

FIG. 6 is a view for explaining the operation of the request queue 125 in the case of preemptive reading of access requests.

For example, in the same way as in the case without preemptive reading of access requests explained above using FIG. 5, the access requests $R_{j+0}$, $R_{j+1}$, $R_{j+2}$, $R_{j+3}$, $R_{j+4}$, and $R_{j+5}$ are stored in the queue entry banks 306, 305, 304, 303, 302, and 301 as shown in FIG. 6A.

Figure 7:
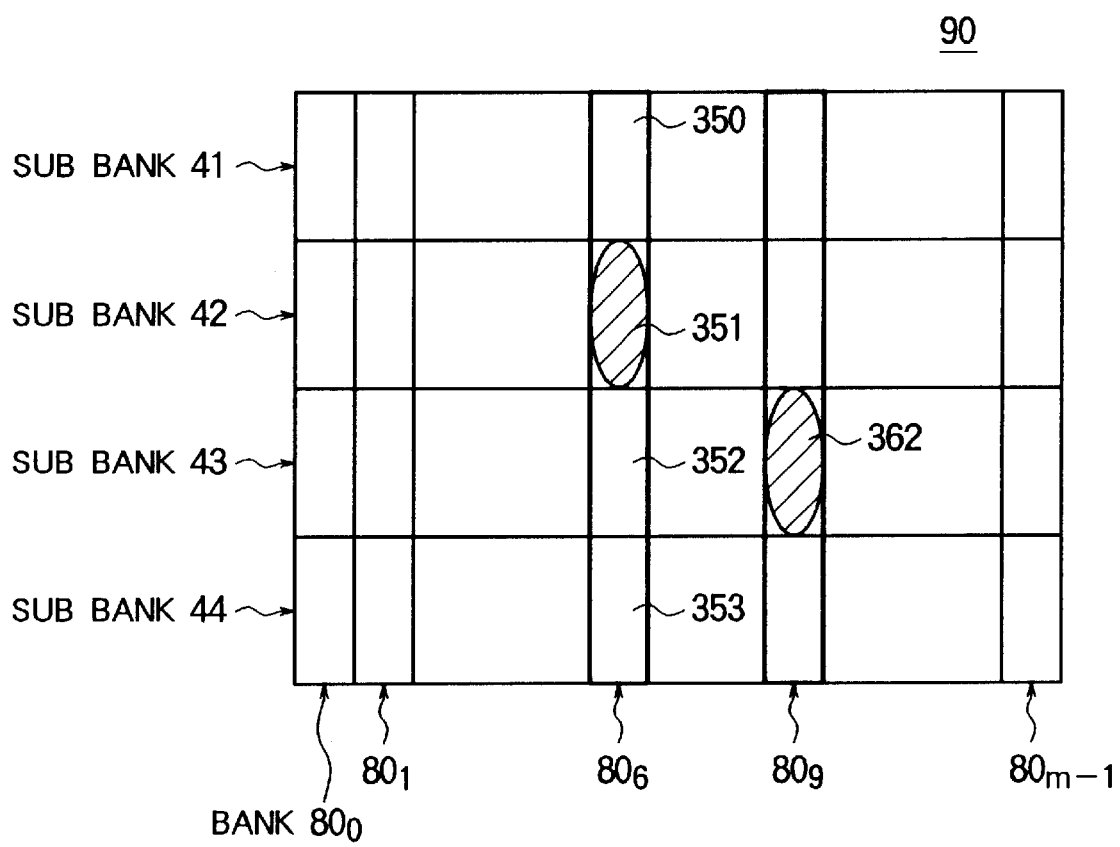
FIG. 7 is a view of the state of storage of sub-banks for explaining an operation of the request queue shown in FIG. 6.

Also, an access having a page fault arises in the sub-page 351 by the access request $R_{j-1}$, and a page composed of sub-pages 350 to 353 is transferred from the main memory 7 shown in FIG. 1 to the bank $80_6$ of the memory cell region 90 shown in FIG. 7 via the external access bus 26.

At this time, the control circuit 310 shown in FIG. 4 determines whether or not the respectively stored access requests are ready to be executed from the queue entry banks 301 toward 306 in order.

By this, the control circuit 310 judges, for example, that the access request $R_{j+0}$ and $R_{j+1}$ have page faults and are not ready to be executed, while because the access request $R_{j+2}$ is an access without page fault and an access to the sub-page 362 stored in the different bank $80_9$ which is different from the bank $80_6$, judges that the access request $R_{j+2}$ is ready to be executed.

Then, in response to control from the control circuit 310 shown in FIG. 4, the queue entry bank 304 and the control circuit 310 are connected via the multiplexer 312, and the access request $R_{j+2}$ stored in the queue entry bank 304 is output to the control circuit 33. Due to this, the access request $R_{j+2}$ is executed and the sub-page 362 is output to the processor elements $23_1$ to $23_n$ which made the access request $R_{j+2}$ via the common bus 22. Namely, the access request $R_{j+2}$ is executed prior to the access requests $R_{j+0}$ and $R_{j+1}$.

At this time, for example, page transfer processing between the main memory 7 and the shared memory 24 via the external access bus 26 by the access request $R_{j-1}$ and the sub-page transfer processing between the shared memory 24 and the processor elements $23_1$ to $23_n$ via the common bus 22 by the access request $R_{j+2}$ are performed in parallel.

When the access request $R_{j+2}$ is output to the control circuit 33, the access requests $R_{j+3}$, $R_{j+4}$, and $R_{j+5}$ are shifted (transferred) and stored respectively in the queue entry banks 304, 302, and 302. Also, the access request $R_{j+6}$ from the processor elements $23_1$ to $23_n$ is stored in the queue entry bank 301 via the common bus 22 and the memory internal bus 51. Note that the access requests $R_{j+0}$ and $R_{j+1}$ are respectively stored in the queue entry banks 306 and 305 continuously. Due to this, the state of storage of the queue entry block 300 becomes as shown in FIG. 6.

Note that in the example shown in FIG. 6, a case was shown where the access requests $R_{j+0}$ and $R_{j+1}$ had page faults and the access request $R_{j+2}$ was immediately executable, however, in the case where the access requests $R_{j+0}$, $R_{j+1}$, $R_{j+2}$, $R_{j+3}$, and $R_{j+4}$ are accesses having page faults and the access request $R_{j+5}$ is immediately executable, the access request $R_{j+5}$ is executed prior to the access requests $R_{j+0}$, $R_{j+1}$, $R_{j+2}$, $R_{j+3}$, and $R_{j+4}$ output to the control circuit 33 to be executed.

Multiple Access

Figure 8:
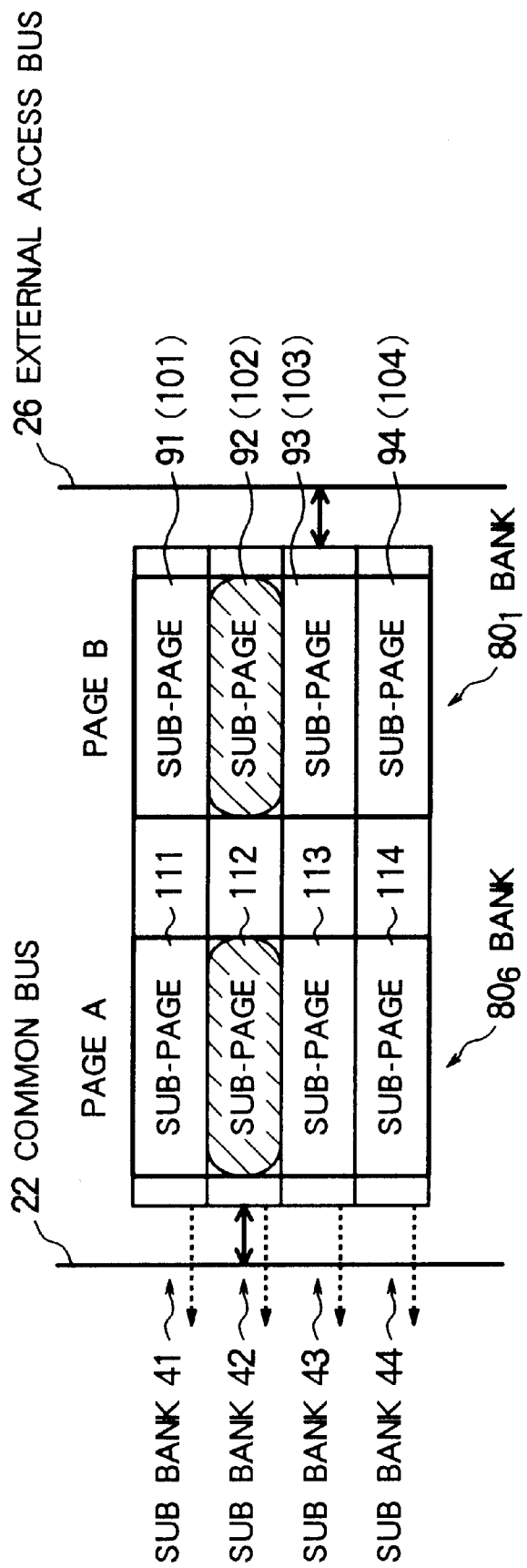
FIG. 8 is a view for explaining a multiple access operation of the parallel processor shown in FIG. 1.
Figure 9:
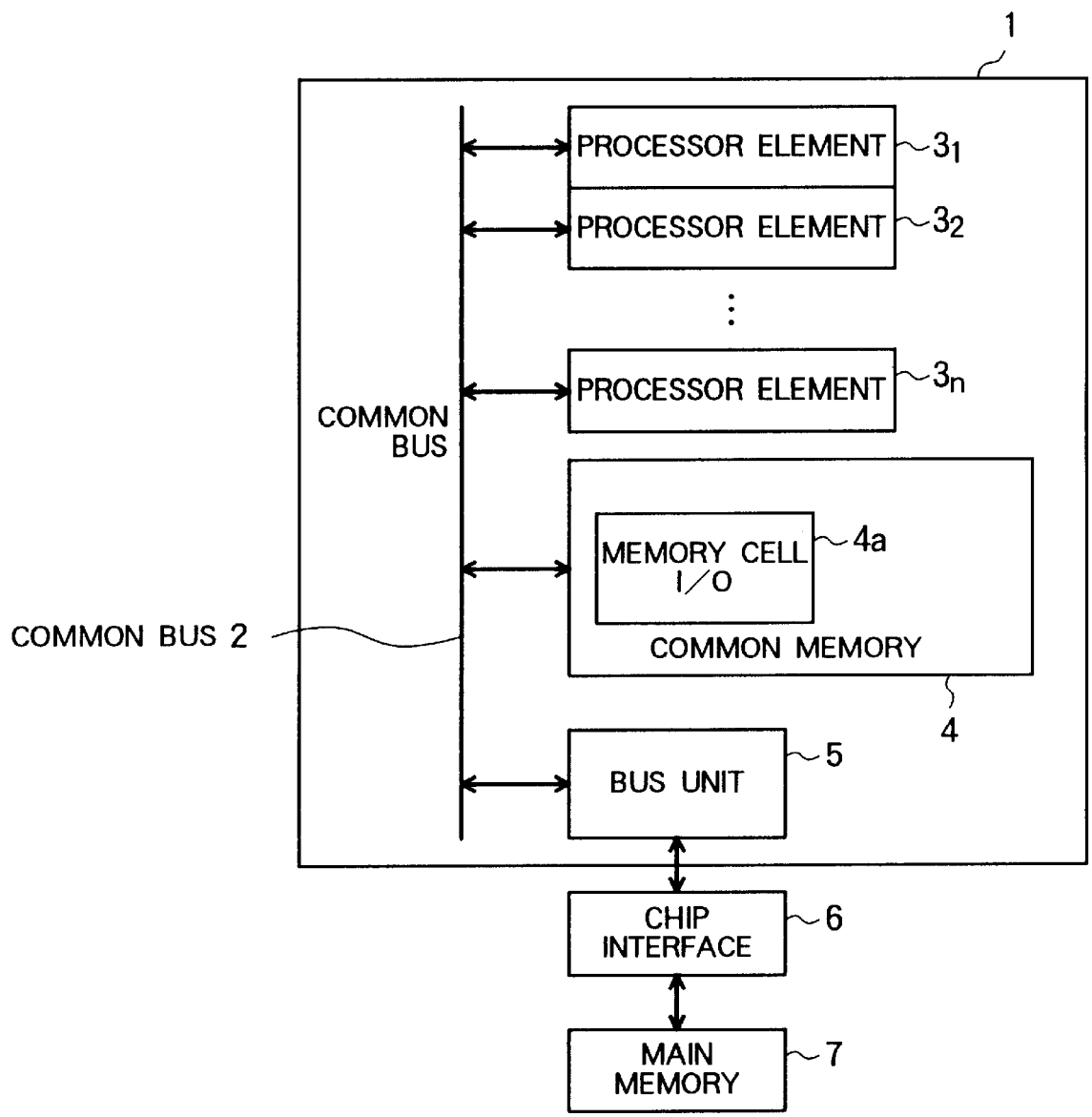
FIG. 9 is a view of the system configuration of a general parallel processor of the related art.

Next, as shown in FIG. 8, an explanation will be given of processing of a parallel processor 21 in the case where a read request is made from a processor element $23_4$ other than a processor element $23_3$ to a bank $80_6$ of the shared memory 24 while sub-pages 91 to 94 stored in the bank $80_1$ of the shared memory 24 and sub-pages 101 to 104 stored in the main memory 7 are being exchanged via the memory internal bus 52 and external access bus 26 in response to a read request from the processor element $23_3$.

In this case, the read request to the sub-page 112 is output from the processor element $23_4$ to the shared memory 24 via the common bus 22. This read request is output as a read request control signal S70 to a common bus control circuit 31.

At this time, since the sub-page 112 is stored in the memory sub-bank 42, a control signal S31 is output from the common bus control circuit 31 to the address decoder 58 and the multiplexer 54 is connected to the memory internal bus 51. As a result, the sub-page 112 is output to the processor element $23_4$ via the memory internal bus 51 and the common bus 22.

In the parallel processor 21, exchange processing of the sub-pages 91 to 94 stored in the bank $80_1$ of the shared memory 24 and the sub-pages 101 to 104 stored in the main memory 7 is carried out in parallel to the transfer processing of the sub-page 112.

Namely, in the parallel processor 21, the exchange processing of sub-pages between the processor elements $23_1$ to $23_n$ and the shared memory 24 and the exchange processing of pages between the shared memory 24 and the main memory 7 can be multiplexly performed.

As explained above, according to the parallel processor 21, it is possible to execute the access requests which are ready to be executed prior to access requests which are output before them without following the output order of the access requests output from the processor elements $23_1$ to $23_n$ to the shared memory 24. Therefore, it is possible to carry out the processing effectively in response to the access requests, and the processing performance can be improved.

Also, in the field of image processing etc., the data within an identical page is continuously accessed from the processor elements $23_1$ to $23_n$ in many cases. In the parallel processor 21, however, when a page fault occurs, in addition to a requested sub-page, three other sub-pages having continuous addresses with the requested sub-page are read from the main memory 7 to the shared memory 24, so that the probability that a page fault will occur next can be reduced. Namely, considering the characteristics of image processing, there is a high probability in the near future that access will be made from the processor elements $23_1$ to $23_n$ to a sub-page having a continuous address with the requested sub-page. Thus, reading these sub-pages together with the requested sub-page from the main memory 7 to the shared memory 24 is effective in reducing the rate of occurrence of future page faults.

Also, in the parallel processor 21, sub-page exchange processing between the processor elements $23_1$ to $23_n$ and the shared memory 24 and page exchange processing between the shared memory 24 and the main memory 7 can be performed in parallel by using a memory cell having a one-port structure as memory cells for the shared memory 24, so it is possible to realize high speed processing by a small-sized circuit. Namely, the shared memory 24 has a single-port structure, but can realize almost the same functional performance as a 2-port structured memory.

Note that the present invention is not limited to the above embodiments.

For example, in the above embodiments, the request queue 125 for storing the access requests by the queue method was given as an example of the access request managing means, however, other than the queue method, the access request managing means can be, for example, configured to receive as input the access requests, stores them at fixed addresses in a predetermined pattern, and output the same to the control circuit 33.

Also, in the above embodiment, a case where the request queue 125 is configured by six stages of queue entry banks connected in series was given as an example, however, any number of the queue entry banks may be connected in series. Note that the larger the number, the higher the probability that an access request not accompanied by a page hit will be stored in the request queue 125, therefore the performance of the parallel processor 21 is improved.

Also, in the above embodiment, the example was given of the case where the processor elements $23_1$ to $23_n$ shown in FIG. 1 read data from a sub-page, however, the transfer processing of the sub-pages via the common bus 22 and the transfer processing of the pages via the external access bus 26 are the same in the case of writing data in the sub-page as well.

Also, in the above embodiment, the example was given for a case where the memory cell region of the shared memory 24 is divided into four memory sub-banks 41 to 44, however, any number of memory sub-banks is possible. Accordingly, for example, the memory cell region of the shared memory 24 can be divided into eight memory sub-banks. In this case, one page is composed of eight sub-pages.

Also, in the above embodiment, the amount of data of a single sub-page was set to 512 bytes, however, the amount of data is not especially limited and can be 256 bytes, 1024 bytes, etc.

Also, in the page exchange processing between the shared memory 24 and the main memory 7 explained with reference to FIG. 8, the sub-pages 91, 93, and 94 stored in the sub-banks 41, 43, and 44 can be exchanged with the main memory 7 in any order after performing the exchange processing of the sub-page 92 stored in the sub-bank 42.

For example, in the above embodiment, the exchange was carried out from the requested sub-page 92 to the direction the next address is incremented to, that is, in an order of the sub-pages 93, 94, and 91. However, the exchange can be carried out in an order of the sub-pages 91, 94, and 93 after the sub-page 92, which is the direction of decrementing the addresses.

Also, in the page exchange processing between the shared memory 24 and the main memory 7 explained with reference to FIG. 8, there are 24 (=4×3×2×1) patterns of order for exchange of the sub-pages 91 to 94. Accordingly, in the parallel processor 21, the exchange of sub-pages can be carried out in any order of the 24 patterns between the shared memory 24 and the main memory 7. For example, the sub-pages can be exchanged every time in an order of the sub-pages 91, 92, 93, and 94 regardless of the access requests from for example the processor elements $23_1$ to $23_n$.

Also, in the present invention, a determination circuit may be provided which, for example, determines an operation mode of the processor elements $23_1$ and $23_n$ and determines whether a data access pattern of each processor elements $23_1$ to $23_n$ is in a direction of increasing the main address or decreasing it. In this case, it can be configured to shorten the time for waiting for an access based on the results of determination of the determination circuit by flexibly setting the order of the exchange of sub-pages between the shared memory 24 and the main memory 7. Here, it is preferable to provide a programmable circuit, in addition to a fixed logical circuit, such as a sequencer capable of the flexibly changing an order of exchange in accordance with conditions as means for controlling the order of exchange of the sub-pages in the shared memory 24.

Also, in the above parallel processor 21, the example was given for a case of using one set of the memory internal bus 51 and the common bus 22 as shown in FIG. 2, however a plurality of sets of the memory internal bus 51 and the common bus 22 within the number of the memory sub-banks may be provided. In this case, in accordance with the number of sets, simultaneous accesses become possible from the processor elements $23_1$ to $23_n$ to different banks in the shared memory 24, therefore further higher speed processing can be realized.

As explained above, according to the parallel processor of the present invention, the waiting times of processor elements for accessing a shared memory can be shortened, so a higher processing performance can be realized.

Also, according to the processing method of the present invention, the waiting times of processor elements for accessing a shared memory can be shortened, so the processor elements can to realize higher processing performance.

While the invention has been described with reference to specific embodiment chosen for purpose of illustration, it should be apparent that numerous modifications could be made thereto by those skilled in the art without departing from the basic concept and scope of the invention.

What is claimed is:

1. A parallel processor comprising:
    a plurality of processor elements, each including an internal memory storing one or more sub-pages and performing using data stored in the internal memory;
    a first data bus connected to the plurality of processor elements;
    a second data bus connected in an external memory; and
    a shared memory connected to both the first and second buses;
    the shared memory including:
        a storage means having a plurality of sub-banks storing the sub-pages,
        a control means for controlling data transfer between the internal memory of the processor elements and the storage means through the first bus and data transfer between the storage means and the external memory through the second bus, and
        an access request management means for receiving as input an access request which generates a page fault to the storage means from the processor elements, storing another access request when another access request is input during the data transfer due to the access request between the shared memory and the external memory through the second bus, and causing the control means to execute the stored other access request when the stored other access request does not generate a page fault.

2. A parallel processor according to claim 1, wherein the access request management means enables storage of a plurality of access requests and makes the control means execute an access request among the plurality of stored access requests which does not generate a page fault when a plurality of access requests are stored prior to a stored access request generating a page fault.

3. A parallel processor according to claim 1, wherein the access management means makes the control means execute access requests in order of storage among the stored plurality of access requests which do not generate a page fault when a plurality of access requests which do not generate a page fault are stored.

4. A parallel processor according to claim 1, wherein the access management means stores the plurality of access requests by a queue method.

5. A parallel processor according to claim 1, further comprising a selecting means for connecting the plurality of sub-banks to the first bus and the second bus.

6. A parallel processor according to claim 1, wherein the control means performs parallel processing for transfer of a sub-page between the storage means and a processor element and for transfer of a sub-page between the storage means shared memory and the external memory when the sub-page to be transferred between the storage means of the shared memory and the processor element and the sub-page which is to be transferred between the storage means and the external memory differ.

7. A parallel processor according to claim 1, wherein a data transfer rate of the first bus is equal to or faster than the data transfer rate of the second bus.

8. A parallel processor according to claim 1, wherein each sub-bank of a storage region of the storage means has a single data port.

9. A parallel processor according to claim 1, wherein the control means stores the plurality of sub-pages comprising a same page in different sub-banks.

10. A parallel processor according to claim 1, wherein the plurality of sub-banks of the storage means have the same memory capacity.

11. A parallel processor according to claim 1, wherein the number of the sub-banks of the storage means is equal to the number of the sub-banks forming a page.

12. A parallel processor according to claim 1, wherein a processor element has a plurality of sub-banks, each storing a single sub-page.

13. A parallel processor according to claim 1, wherein the plurality of sub-pages comprising a page have continuous addresses in an address domain of the external memory.

14. A parallel processor according to claim 1, wherein the data of a sub-page is image data, and
   the plurality of processor elements carry out image processing using the image data.

15. A processing method including the steps of:
   storing one or more sub-pages in a shared memory having storage regions comprising a plurality of sub-banks, each having a single data port and accessed by a plurality of processor elements;
   controlling transfer between the internal memory of the processor elements and the shared memory through a first data bus and data transfer between the shared memory and an external memory through a second data bus in response to an access request from a processor element; and
   when a processor element issues an access request accompanied with a page fault to the shared memory and during the transfer of data between the shared memory and external memory through the second bus in response to that access request another processor element issues and access request, storing the access request issued by the other processor element, judging if the stored access request causes a page fault or not, and, when judging that it does not cause a page fault, executing the stored access request.

16. A processing method according to claim 15, said method executing a plurality of stored access requests not causing page faults before a previously stored access request accompanied with the page fault when a plurality of access requests are stored.

17. A processing method according to claim 15, said method executing a plurality of stored access requests which do not cause a page fault in the order of storage when a plurality of access requests which do not cause a page fault are stored.

18. A processing method according to claim 15, said method storing the plurality of access requests by a queue method.

19. A processing method according to claim 15, said method performing control for parallel processing for transfer of a sub-page between the shared memory and a processor element and for transfer of a sub-page between the shared memory and the external memory when the sub-page to be transferred between the shared memory and the processor element and the sub-page which is to be transferred between the shared memory and the external memory differ.

20. A processing method according to claim 15, wherein a data transfer rate of the first bus is equal to or higher than the data transfer rate of the second bus.

21. A parallel processor according to claim 1, wherein the control means controls data transfer between the storage means of the shared memory and the external memory in page units.

* * * * *

UNITED STATES PATENT AND TRADEMARK OFFICE
CERTIFICATE OF CORRECTION

PATENT NO. : 6,381,686 B1
DATED : April 30, 2002
INVENTOR(S) : Yoshihiko Imamura It is certified that error appears in the above-identified patent and that said Letters Patent is hereby corrected as shown below:

Column 12,
Line 14, "and" should read -- an --.

Signed and Sealed this

Twenty-eighth Day of June, 2005

JON W. DUDAS
*Director of the United States Patent and Trademark Office*